(12) United States Patent
Park et al.

(10) Patent No.: US 9,905,325 B2
(45) Date of Patent: Feb. 27, 2018

(54) PRECURSOR FOR PREPARING LITHIUM COMPOSITE TRANSITION METAL OXIDE AND METHOD FOR PREPARING THE SAME

(71) Applicant: LG Chem, Ltd., Seoul (KR)

(72) Inventors: Byung Chun Park, Daejeon (KR); Ho Suk Shin, Seoul (KR); Sung-Kyun Chang, Daejeon (KR); Seong Hoon Kang, Daejeon (KR); Dong Hun Lee, Daejeon (KR); Sang Min Park, Daejeon (KR)

(73) Assignee: LG Chem, Ltd. (KR)

( * ) Notice: Subject to any disclaimer, the term of this patent is extended or adjusted under 35 U.S.C. 154(b) by 87 days.

(21) Appl. No.: 15/219,483

(22) Filed: Jul. 26, 2016

(65) Prior Publication Data

US 2016/0336584 A1 Nov. 17, 2016

Related U.S. Application Data

(60) Division of application No. 14/452,833, filed on Aug. 6, 2014, now Pat. No. 9,431,143, which is a continuation of application No. PCT/KR2013/001722, filed on Mar. 5, 2013.

(30) Foreign Application Priority Data

Mar. 16, 2012 (KR) .......................... 10-2012-0027119

(51) Int. Cl.
| | | |
|---|---|---|
| *H01B 1/08* | (2006.01) | |
| *H01B 1/06* | (2006.01) | |
| *C01G 45/00* | (2006.01) | |
| *C01G 51/00* | (2006.01) | |
| *C01G 53/00* | (2006.01) | |
| *C01B 25/45* | (2006.01) | |
| *C01B 13/36* | (2006.01) | |
| *C01G 45/02* | (2006.01) | |
| *C01G 51/04* | (2006.01) | |
| *C01G 53/04* | (2006.01) | |
| *H01M 4/131* | (2010.01) | |
| *H01M 4/505* | (2010.01) | |
| *H01M 4/525* | (2010.01) | |
| *H01M 10/052* | (2010.01) | |

(52) U.S. Cl.
CPC .............. *H01B 1/08* (2013.01); *C01B 13/36* (2013.01); *C01B 25/45* (2013.01); *C01G 45/006* (2013.01); *C01G 45/02* (2013.01); *C01G 51/006* (2013.01); *C01G 51/04* (2013.01); *C01G 53/006* (2013.01); *C01G 53/04* (2013.01); *C01G 53/50* (2013.01); *H01B 1/06* (2013.01); *H01M 4/131* (2013.01); *H01M 4/505* (2013.01); *H01M 4/525* (2013.01); *C01P 2006/11* (2013.01); *C01P 2006/40* (2013.01); *H01M 10/052* (2013.01)

(58) Field of Classification Search
CPC .......... H01B 1/06; H01B 1/08; H01M 4/131; H01M 4/1315; H01M 4/485; H01M 4/505; H01M 4/525; H01M 4/5825; C01G 45/006; C01G 45/02; C01G 45/12; C01G 45/1221; C01G 45/1228; C01G 51/006; C01G 51/04; C01G 51/42; C01G 51/44; C01G 51/50; C01G 53/006; C01G 53/04; C01G 53/42; C01G 53/44; C01G 53/50; C01B 25/45
See application file for complete search history.

(56) References Cited

U.S. PATENT DOCUMENTS

| | | |
|---|---|---|
| 4,913,989 A | 4/1990 | Glemser et al. |
| 5,591,548 A | 1/1997 | Mao |
| 5,789,113 A | 8/1998 | Joo et al. |
| 2009/0197173 A1 | 8/2009 | Nakaoka |

(Continued)

FOREIGN PATENT DOCUMENTS

| | | |
|---|---|---|
| JP | H01298644 A | 12/1989 |
| JP | H06275277 A | 9/1994 |

(Continued)

OTHER PUBLICATIONS

International Search Report for PCT/KR2013/001722 dated May 16, 2013.

*Primary Examiner* — Harold Pyon
*Assistant Examiner* — Matthew R Diaz
(74) *Attorney, Agent, or Firm* — Lerner, David, Littenberg, Krumholz & Mentlik, LLP

(57) ABSTRACT

Disclosed is a transition metal precursor used for preparation of lithium composite transition metal oxide, the transition metal precursor comprising a composite transition metal compound represented by the following Formula 1:

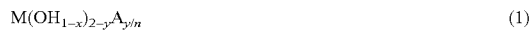

$$M(OH_{1-x})_{2-y}A_{y/n} \qquad (1)$$

wherein
M comprises two or more selected from the group consisting of Ni, Co, Mn, Al, Cu, Fe, Mg, B, Cr and second period transition metals;
A comprises one or more anions except $OH_{1-x}$;
$0 < x < 0.5$;
$0.01 \leq y \leq 0.5$; and
n is an oxidation number of A.

The transition metal precursor according to the present invention contains a specific anion. A lithium composite transition metal oxide prepared using the transition metal precursor comprises the anion homogeneously present on the surface and inside thereof, and a secondary battery based on the lithium composite transition metal oxide thus exerts superior power and lifespan characteristics, and high charge and discharge efficiency.

5 Claims, No Drawings

(56) References Cited

U.S. PATENT DOCUMENTS

| | | | |
|---|---|---|---|
| 2009/0297947 A1* | 12/2009 | Deng | H01M 4/0471 |
| | | | 429/218.1 |
| 2009/0314985 A1* | 12/2009 | Malcus | H01M 4/1391 |
| | | | 252/182.1 |
| 2010/0102282 A1* | 4/2010 | Malcus | B01J 19/0066 |
| | | | 252/519.14 |
| 2011/0180748 A1 | 7/2011 | Jahn et al. | |
| 2012/0104311 A1 | 5/2012 | Levasseur et al. | |
| 2012/0112125 A1 | 5/2012 | Chang et al. | |
| 2012/0132868 A1* | 5/2012 | Schulz-Dobrick | C01G 1/00 |
| | | | 252/519.14 |
| 2012/0175568 A1* | 7/2012 | Krippels | C01B 13/36 |
| | | | 252/519.14 |

FOREIGN PATENT DOCUMENTS

| | | |
|---|---|---|
| JP | H09147866 A | 6/1997 |
| JP | 1988-187571 B2 | 8/1998 |
| JP | H11345613 A | 12/1999 |
| JP | 2003073127 A | 3/2003 |
| JP | 2003313030 A | 11/2003 |
| JP | 2009179545 A | 8/2009 |
| JP | 2010018472 A | 1/2010 |
| JP | 2010505732 A | 2/2010 |
| JP | 2010505733 A | 2/2010 |
| JP | 2011057518 A | 3/2011 |
| JP | 2012518871 A | 8/2012 |
| KR | 20090066291 A | 6/2009 |
| KR | 100927244 B1 | 11/2009 |
| WO | 2010094394 A1 | 8/2010 |
| WO | 2012070012 A1 | 5/2012 |

\* cited by examiner

PRECURSOR FOR PREPARING LITHIUM COMPOSITE TRANSITION METAL OXIDE AND METHOD FOR PREPARING THE SAME

CROSS-REFERENCE TO RELATED APPLICATIONS

This application is a divisional of U.S. application Ser. No. 14/452,833 filed on Aug. 6, 2014, which is a continuation of International Application No. PCT/KR2013/001722 filed on Mar. 5, 2013, which claims the benefit of Korean Patent Application No. 10-2012-0027119, filed on Mar. 16, 2012, the disclosures of which are incorporated herein by reference.

TECHNICAL FIELD

The present invention relates to a precursor used for preparation of lithium composite transition metal oxide and a method for preparing the same. More specifically, the present invention relates to a transition metal precursor used for preparation of lithium composite transition metal oxide comprising a specific composite transition metal compound and a method for preparing the same.

BACKGROUND ART

Technological development and increased demand for mobile equipment have led to a rapid increase in demand for secondary batteries as energy sources. Among these secondary batteries, lithium secondary batteries having high energy density and voltage, long cycle span and low self-discharge are commercially available and widely used.

Lithium-containing cobalt oxide ($LiCoO_2$) is generally used as a cathode active material for lithium secondary batteries. Use of lithium-containing manganese oxides such as $LiMnO_2$ having a layered-crystal structure and $LiMn_2O_4$ having a spinel-crystal structure, and lithium-containing nickel oxide ($LiNiO_2$) is also considered.

Among these cathode active materials, $LiCoO_2$ is the most generally used owing to superior physical properties such as superior cycle characteristics, but has low stability and is costly due to resource limitations of cobalt as a raw material.

Lithium manganese oxides such as $LiMnO_2$ and $LiMn_2O_4$ advantageously use, as a raw material, manganese which is abundant and eco-friendly, thus attracting much attention as a cathode active material alternative to $LiCoO_2$. However, these lithium manganese oxides have disadvantages of low capacity and bad cycle characteristics.

In addition, lithium nickel oxides such as $LiNiO_2$ are cheaper than cobalt oxides and have higher discharge capacity, when charged to 4.25V. More specifically, doped $LiNiO_2$ has a reversible capacity of about 200 mAh/g which is higher than $LiCoO_2$ capacity (about 153 mAh/g). Accordingly, in spite of slightly low average discharge voltage and volumetric density, commercial batteries comprising $LiNiO_2$ as a cathode active material have improved energy density and a great deal of research into these nickel-based cathode active materials is thus actively conducted in order to develop high-capacity batteries recently.

In this regard, many conventional techniques focus on properties of $LiNiO_2$-based cathode active materials and improvement in preparation process of $LiNiO_2$ and suggest lithium transition metal oxides wherein nickel is partially substituted by other transition metal such as Co or Mn.

However, the problems of $LiNiO_2$-based cathode active materials including high preparation costs, swelling caused by gas generation in batteries, low chemical stability and high pH have been satisfactorily not yet solved.

Accordingly, in the related art, there is an attempt to improve performance of batteries by applying a material such as LiF, $Li_2SO_4$ or $Li_3PO_4$ to the surface of lithium nickel-manganese-cobalt oxide. In this case, the substance is disposed only on the surface of the lithium nickel-manganese-cobalt oxide, thus disadvantageously having a limitation on exertion of effects to a desired level and requiring a separate process for application of the material to the surface thereof.

However, in spite of such various attempts, lithium composite transition metal oxide exhibiting satisfactory performance has yet to be developed.

DISCLOSURE

Technical Problem

Therefore, the present invention has been made to solve the above and other technical problems that have yet to be resolved.

As a result of a variety of extensive and intensive studies and experiments to solve the problems as described above, the present inventors developed a precursor containing a composite transition metal compound having a specific anion and discovered that secondary batteries based on lithium composite transition metal oxide produced from the precursor exhibit superior power and lifespan characteristics and have superior charge/discharge efficiency. The present invention has been completed based on this discovery.

Technical Solution

Accordingly, the present invention provides a transition metal precursor used for preparation of lithium composite transition metal oxide which is an electrode active material for lithium secondary batteries, the transition metal precursor comprising a composite transition metal compound represented by the following Formula 1:

$$M(OH_{1-x})_{2-y}A_{y/n} \quad (1)$$

wherein

M comprises two or more selected from the group consisting of Ni, Co, Mn, Al, Cu, Fe, Mg, B, Cr and second period transition metals;

A comprises one or more anions except $OH_{1-x}$;

$0<x<0.5$;

$0.01 \leq y \leq 0.5$; and n is an oxidation number of A.

Methods including doping or surface-treating an electrode active material for conventional lithium secondary batteries with a lithium compound comprising a specific anion such as $F^-$, $PO_4^{3-}$ or $CO_3^{2-}$, or mixing the same with the lithium compound are known. For example, one conventional method suggests an electrode active material for secondary batteries obtained by mixing conventional lithium nickel-based oxide with lithium phosphate having a specific structure. Another conventional method is use of lithium manganese-based oxide coated with lithium phosphate as an electrode active material in order to prevent elution of manganese ions from an electrolyte solution.

However, these conventional methods require an additional process such as surface-treatment of the electrode active material with a lithium compound after preparation of the electrode active material, thus causing an increase in manufacturing costs of lithium secondary batteries. In addition, it is difficult to accomplish a desired level of effects, since specific anions are present on only the surface of the electrode active material.

Accordingly, the transition metal precursor according to the present invention is substituted by a specific amount of one or more anions except for $OH_{1-x}$. The inventors of the present application discovered that the anions may be homogeneously present on the surface and the inside of lithium composite transition metal oxide when lithium composite transition metal oxide is prepared using the anion-substituted precursor and newly established that secondary batteries based on the precursor possess superior power and lifespan and exhibit high charge and discharge efficiency.

That is, the specific anions homogeneously present on the surface and the inside of the lithium composite transition metal oxide contribute to improvement in ion conductivity between grains and reduce sizes of grown grains or crystals, thus reducing structure variation upon generation of oxygen in the activation process, increasing surface area and thereby improving performance required for batteries such as rate characteristics.

In Formula 1, M comprises two or more selected from the elements defined above.

In a preferred embodiment, M comprises one or more transition metals selected from the group consisting of Ni, Co and Mn and imparts physical properties of at least one of the transition metals to lithium composite transition metal oxide. Particularly preferably, M comprises two types of transition metals selected from the group consisting of Ni, Co and Mn, or all the transition metals.

In addition, in Formula 1, there is no limitation as to the anion A so long as the anion A contributes to improvement in ion conductivity between grains.

In a preferred embodiment, A comprises one or more selected from the group consisting of $PO_4$, $CO_3$, $BO_3$, and F. Of these, $PO_4$ is particularly preferred since it has a considerably stable structure and a high lithium diffusion coefficient when bonded to lithium, thus improving stability of the lithium composite transition metal oxide.

When a content of the anion A is excessively high, the anion A interferes with crystallization of lithium composite transition metal oxide comprising the same and makes improvement in active material performance difficult. When the content is excessively low, it is difficult to achieve desired effects. The content of A in the composite transition metal compound is preferably 0.01 to 0.5 mol %, particularly preferably not less than 0.03 and not more than 0.2 mol %, based on the total amount (in mol) of the composite transition metal compound, as described above.

For reference, the content of the anion A is determined within the range according to the oxidation number of the anion, as described above.

A preferred example of the composite transition metal compound includes a composite transition metal compound represented by the following Formula 2.

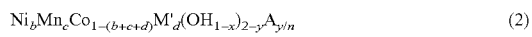

wherein $0.3 \le b \le 0.9$, $0.1 \le c \le 0.6$, $0 \le d \le 0.1$, $b+c+d \le 1$; M' comprises one or two or more selected from the group consisting of Al, Mg, Cr, Ti, Si, Cu, Fe and Zr; and A, x, y and n are as defined in Formula 1 above.

The composite transition metal compound comprises a high content of nickel and is particularly preferable for preparation of cathode active materials for high-capacity lithium secondary batteries. That is, regarding the content (b) of nickel, nickel is present in an excess amount, as compared to manganese and cobalt, based on the total amount (in unit of mol) and is 0.3 to 0.9, as defined above. When the content of the nickel is lower than 0.3, it is difficult to obtain high capacity, and when the content of the nickel exceeds 0.9, disadvantageously, safety is greatly deteriorated. More preferably, the content of nickel is 0.33 to 0.8.

In addition, the content (c) of manganese is 0.1 to 0.6, preferably 0.1 to 0.5, as defined above.

In some cases, the metal, M' may be substituted within the range of 0.1 or less by one, or two or more selected from the group consisting of Al, Mg, Cr, Ti and Si and is preferably substituted within the range of 0.08 or less.

The content $(1-(b+c+d))$ of cobalt is changed according to a sum $(b+c+d)$ of the contents of nickel, manganese and the metal M'. When the content of cobalt is excessively high, overall cost of raw materials increases due to high content of cobalt and reversible capacity slightly decreases, and when the content thereof is excessively low, it may be difficult to obtain both sufficient rate characteristics and high powder density of batteries. Accordingly, the sum $(b+c+d)$ of the contents of nickel, manganese and metal M' is preferably 0.05 to 0.4.

Such a transition metal compound having a high tap density since it comprises the anion A. In a preferred embodiment, the transition metal compound has a tap density of 1.5 to 2.5 g/cc.

The transition metal precursor according to the present invention at least comprises the composite transition metal compound of Formula 1. In a preferred embodiment, the transition metal precursor comprises the composite transition metal compound in an amount of 30% by weight or more, more preferably 50% by weight or more.

As compared to a transition metal precursor comprising no composite transition metal compound of Formula 1, the transition metal precursor can be prepared using lithium composite transition metal oxide exhibiting superior physical properties, as can be seen from Examples and Experimental Examples described later.

The remaining component of the transition metal precursor may be variable and is for example $M(OH_{1-x})_2$ (wherein M and x are as defined in Formula 1 above).

The present invention also provides the composite transition metal compound of Formula 1 and the composite transition metal compound of Formula 1 is a novel substance not previously known in the art.

The transition metal precursor comprising the composite transition metal compound is preferably prepared by introducing a compound containing the anion A during a preparation process. As described above, the method according to the present invention does not require an additional process for reacting the prepared lithium composite transition metal oxide with the compound containing the anion A, thus being disadvantageously simple, easy and highly economically efficient. In addition, lithium composite transition metal oxide prepared from the precursor exerts superior cathode active material performance, as compared to lithium composite transition metal oxide not using the precursor.

Hereinafter, a method for preparing the transition metal precursor according to the present invention will be described in detail.

The transition metal precursor may be prepared by a coprecipitation method using a basic substance in which a transition metal-containing salt and an anion A-containing compound are dissolved in specific amounts.

Coprecipitation is a method for preparing the transition metal precursor by simultaneously precipitating two or more types of transition metal elements in an aqueous solution. In a specific example, the composite transition metal compound comprising two or more types of transition metals may be prepared by mixing transition metal-containing salts in a desired molar ratio while considering the contents of transition metals to prepare an aqueous solution, mixing the aqueous solution with a strong base such as sodium hydroxide and optionally maintaining a pH at a basic range through addition of an additive such as ammonia source. In this case, average particle diameter, particle diameter distribution and particle density can be adjusted to desired levels by suitably controlling temperature, pH, reaction time, slurry concentration, ion concentration and the like. The pH range is 9 to 13, preferably 10 to 12. The reaction may be performed in multiple steps, as necessary.

The transition metal-containing salt preferably has an anion which is readily degraded and is highly volatile, and is sulfate or nitrate, particularly preferably sulfate. Examples of the transition metal-containing salt include, but are not limited to, nickel sulfate, cobalt sulfate, manganese sulfate, nickel nitrate, cobalt nitrate and manganese nitrate.

Examples of the basic substance include sodium hydroxide, potassium hydroxide, lithium hydroxide and the like. The basic substance is preferably sodium hydroxide, but the present invention is not limited thereto.

In addition, the anion A-containing compound may be represented by $Z_x'A_y'$, wherein Z is at least one selected from the group consisting of Na, $NH_4$ and H, A is at least one selected from the group consisting of $PO_4$, $CO_3$, $BO_3$, and F, and an equation of (an oxidation number of Z×x')+(an oxidation number of A×y')=0 is satisfied, with the proviso that 0<x'<4 and 0<y'<4. In a preferred embodiment, $Z_x'A_y'$ is one or more selected from the group consisting of $Na_3PO_4$, $(NH_4)_3PO_4$, $(NH_4)_2HPO_4$, and $(NH_4)H_2PO_4$.

The compound of $Z_x'A_y'$ is soluble in water and the compound is preferably is added within the range of 0.01 to 0.5 mol % to a reaction chamber after being dissolved in the basic substance defined above, preferably in a sodium hydroxide solution, and then reacts with the transition metal salt for preparing the precursor. In some cases, the compound may be added together with a transition metal-containing salt.

In a preferred embodiment, in the co-precipitation process, an additive and/or alkali carbonate which forms a complex with a transition metal may be further added. For example, the additive may be an ammonium ion source, an ethylene diamine compound, a citric acid compound or the like. Examples of the ammonium ion source include ammonia water, an aqueous ammonium sulfate solution, an aqueous ammonium nitrate solution and the like. The alkali carbonate may be selected from the group consisting of ammonium carbonate, sodium carbonate, potassium carbonate and lithium carbonate. A mixture of two or more of these compounds may be used, if necessary.

The contents of the additive and alkali carbonate may be suitably determined while considering an amount of the transition metal-containing salt, pH or the like.

The transition metal precursor comprising only the composite transition metal compound of Formula 1 may be prepared or a transition metal precursor comprising other composite transition metal compound in addition to the composite transition metal compound of Formula 1 may be prepared according to reaction conditions and details thereof will be clearly understood from the examples described later.

The present invention also provides lithium composite transition metal oxide prepared from the transition metal precursor. More specifically, lithium composite transition metal oxide which is a cathode active material for lithium secondary batteries may be prepared by reacting the transition metal precursor with a lithium-containing material by calcination.

The lithium composite transition metal oxide homogenously comprises the anion A on the surface and the inside of lithium composite transition metal oxide, thus exhibiting superior electrochemical properties. The content of the anion A may be changed according to the number of moles of A substituted in the composite transition metal compound, but is preferably 0.05 to 3% by weight, based on the total weight of lithium composite transition metal oxide.

The lithium composite transition metal oxide is preferably used as an electrode active material for lithium secondary batteries and is used alone or in combination thereof, or as a mixture with other well-known electrode active material for lithium secondary batteries.

In addition, the lithium composite transition metal oxide comprises two or more transition metals and examples thereof include, but are not limited to, layered compounds substituted by one or more transition metals such as lithium cobalt oxide ($LiCoO_2$) or lithium nickel oxide ($LiNiO_2$); lithium manganese oxide substituted by one or more transition metals; lithium nickel-based oxide represented by the formula of $LiNi_{1-y}M_yO_2$ (wherein M comprises Co, Mn, Al, Cu, Fe, Mg, B, Cr, Zn, Ga, or a combination of two or more thereof, and 0.01≤y≤0.7); and lithium nickel cobalt manganese composite oxide represented by $Li_{1+z}Ni_bMn_cCo_{1-(b+c+d)}MdO_{(2-e)}N_e$ (wherein −0.5≤z≤0.5, 0.3≤b≤0.9, 0.1≤c≤0.9), 0≤d≤0.1, 0≤e≤0.05, b+c+d<1, M is Al, Mg, Cr, Ti, Si or Y, and N=F, P or Cl), such as $Li_{1+z}Ni_{1/3}Co_{1/3}Mn_{1/3}O_2$, and $Li_{1+z}Ni_{0.4}Mn_{0.4}Co_{0.2}O_2$.

The lithium composite transition metal oxide is particularly preferably lithium composite transition metal oxide comprising Co, Ni and Mn.

Conditions for reaction between the transition metal precursor and the lithium-containing material for preparing lithium composite transition metal oxide are well-known in the art and a detailed explanation thereof is thus omitted.

The present invention also provides a cathode comprising the lithium composite transition metal oxide as a cathode active material and a lithium secondary battery comprising the cathode.

For example, the cathode is prepared by applying a mixture containing a cathode active material, a conductive material and a binder to a cathode current collector, followed by drying, and a filler may be further optionally added to the mixture.

The cathode current collector is generally manufactured to have a thickness of 3 to 500 μm. Any cathode current collector may be used without particular limitation so long as it has suitable conductivity without causing adverse chemical changes in the fabricated battery. Examples of the cathode current collector include stainless steel, aluminum, nickel, titanium, sintered carbon, and aluminum or stainless steel surface-treated with carbon, nickel, titanium or silver. The cathode current collectors include fine irregularities on the surface thereof so as to enhance adhesion to the cathode active material. In addition, the cathode current collector may be used in various forms including films, sheets, foils, nets, porous structures, foams and non-woven fabrics.

The conductive material is commonly added in an amount of 1 to 20% by weight, based on the total weight of the mixture containing the cathode active material. Any conductive material may be used without particular limitation so long as it has suitable conductivity without causing chemical changes in the fabricated battery. Examples of conductive materials include graphite; carbon blacks such as carbon black, acetylene black, Ketjen black, channel black, furnace black, lamp black and thermal black; conductive fibers such as carbon fibers and metallic fibers; metallic powders such as carbon fluoride powder, aluminum powder and nickel powder; conductive whiskers such as zinc oxide and potassium titanate; conductive metal oxides such as titanium oxide; and polyphenylene derivatives.

The binder is a component which enhances binding of an electrode active material to the conductive material and the current collector. The binder is commonly added in an amount of 1 to 20% by weight, based on the total weight of the mixture comprising the cathode active material. Examples of the binder include polyvinylidene fluoride, polyvinyl alcohol, carboxymethylcellulose (CMC), starch, hydroxypropylcellulose, regenerated cellulose, polyvinyl pyrrolidone, tetrafluoroethylene, polyethylene, polypropylene, ethylene propylene diene terpolymers (EPDM), sulfonated EPDM, styrene butadiene rubbers, fluororubbers and various copolymers.

The filler is optionally added to inhibit expansion of the cathode. Any filler may be used without particular limitation so long as it does not cause adverse chemical changes in the manufactured battery and is a fibrous material. Examples of the filler include olefin polymers such as polyethylene and polypropylene; and fibrous materials such as glass fibers and carbon fibers.

The lithium secondary battery generally comprises a cathode, an anode, a separator and a lithium salt-containing non-aqueous electrolyte, and other components of the lithium secondary battery according to the present invention will be described below.

The anode is produced by applying an anode material to an anode current collector, followed by drying and the components described above may be optionally further added.

Examples of the anode active material include carbon such as hard carbon, graphite-based carbon; metal composite oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group I, II and III elements, halogen; $0 < x \leq 1$; $1 \leq y \leq 3$; $1 \leq z \leq 8$); lithium metals; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni-based materials and the like.

The anode current collector is generally fabricated to have a thickness of 3 to 500 μm. Any anode current collector may be used without particular limitation so long as it has suitable conductivity without causing adverse chemical changes in the fabricated battery. Examples of the anode current collector include copper, stainless steel, aluminum, nickel, titanium, sintered carbon, and copper or stainless steel surface-treated with carbon, nickel, titanium or silver, and aluminum-cadmium alloys. Similar to the cathode current collector, the anode current collector includes fine irregularities on the surface thereof so as to enhance adhesion of anode active materials. In addition, the current collectors may be used in various forms including films, sheets, foils, nets, porous structures, foams and non-woven fabrics.

The separator is interposed between the cathode and the anode. As the separator, an insulating thin film having high ion permeability and mechanical strength is used. The separator typically has a pore diameter of 0.01 to 10 μm and a thickness of 5 to 300 μm. As the separator, sheets or non-woven fabrics made of an olefin polymer such as polypropylene and/or glass fibers or polyethylene, which have chemical resistance and hydrophobicity, are used. When a solid electrolyte such as a polymer is employed as the electrolyte, the solid electrolyte may serve as both the separator and the electrolyte.

The lithium salt-containing, non-aqueous electrolyte is composed of a non-aqueous electrolyte and a lithium salt and examples of preferred electrolytes include non-aqueous organic solvents, organic solid electrolytes, inorganic solid electrolytes and the like.

Examples of the non-aqueous solvent include non-protic organic solvents such as N-methyl-2-pyrollidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate and ethyl propionate.

Examples of the organic solid electrolyte include polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Examples of the inorganic solid electrolyte include nitrides, halides and sulfates of lithium such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH and $Li_3PO_4$—$Li_2S$—$SiS_2$.

The lithium salt is a material that is readily soluble in the above-mentioned non-aqueous electrolyte and examples thereof include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylic acid lithium, lithium tetraphenyl borate and imides.

Additionally, in order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride or the like may be added to the non-aqueous electrolyte. If necessary, in order to impart incombustibility, the non-aqueous electrolyte may further include halogen-containing solvents such as carbon tetrachloride and ethylene trifluoride. Further, in order to improve high-temperature storage characteristics, the non-aqueous electrolyte may additionally contain carbon dioxide gas, and may further contain fluoro-ethylene carbonate (FEC), propene sultone (PRS) or fluoro-propylene carbonate (FPC).

Effects of Invention

As apparent from the fore-going, the lithium composite transition metal oxide prepared using the transition metal precursor substituted by specific anions according to the present invention comprises the transition metal precursor homogeneously present on the surface and inside thereof, thus providing a lithium secondary battery exhibiting high charge and discharge efficiency. The process for preparing lithium composite transition metal oxide requires no additional process due to addition of a compound containing a specific anion and is thus simple, easy and economically efficient.

DETAILED DESCRIPTION OF THE INVENTION

Now, the present invention will be described in more detail with reference to the following examples. These examples are provided only to illustrate the present invention and should not be construed as limiting the scope and spirit of the present invention.

EXAMPLE 1

2 L of distilled water was added to a 3 L tank for a wet-type reactor and nitrogen gas was continuously injected into the tank at a rate of 1 L/min to remove dissolved oxygen. At this time, a temperature of distilled water in the tank was maintained at 45 to 50° C. using a temperature maintenance apparatus. In addition, distilled water present inside the tank was stirred at a rate of 1,000 to 1,200 rpm using an impeller connected to a motor mounted outside the tank.

Nickel sulfate, cobalt sulfate, and manganese sulfate were mixed at a ratio (molar ratio) of 0.40:0.20:0.40 to prepare a transition metal aqueous solution having a concentration of 1.5M. Separately, a 3M sodium hydroxide aqueous solution containing 0.1 mol % of $Na_3PO_4$ was prepared. The transition metal aqueous solution was continuously pumped with a metering pump at 0.18 L/hr to the tank for wet-type reactors tank. The sodium hydroxide aqueous solution was variably pumped such that pH of distilled water present in the wet-type reactor tank was maintained at 11.0 to 11.5 using a control device connected in order to control pH of distilled water in the tank. At this time, an ammonia solution having a concentration of 30% was also continuously pumped to the reactor as an additive at a rate of 0.035 L to 0.04 L/hr. An average retention time of the solutions in the wet-type reactor tank was adjusted to about 5 to 6 hours by controlling flows of the sodium hydroxide aqueous solution and the ammonia solution. After the reaction in the tank reached a steady state, the resulting product was allowed to stand for a retention time to synthesize a density-high composite transition metal precursor.

After the reaction reaches the steady state, a nickel-cobalt-manganese composite transition metal precursor prepared by continuously reacting transition metal ions of the transition metal aqueous solution, hydroxyl ions of sodium hydroxide and ammonia ions of the ammonia solution for 20 hours was continuously obtained through an overflow pipe mounted on the top of a side of the tank.

The composite transition metal precursor thus obtained was washed several times with distilled water and dried in a 120° C. constant-temperature drier for 24 hours to obtain a nickel-cobalt-manganese composite transition metal precursor.

EXAMPLE 2

A transition metal precursor was prepared in the same manner as in Example 1, except that a 3M aqueous sodium hydroxide solution containing 0.2 mol % of $Na_3PO_4$ was used.

EXAMPLE 3

A transition metal precursor was prepared in the same manner as in Example 1, except that a 3M aqueous sodium hydroxide solution containing 0.5 mol % of $Na_3PO_4$ was used.

EXAMPLE 4

A transition metal precursor was prepared in the same manner as in Example 1, except that 0.1 mol % of $(NH_4)_2HPO_4$ was used, instead of $Na_3PO_4$.

COMPARATIVE EXAMPLE 1

A transition metal precursor was prepared in the same manner as in Example 1, except that a 3M aqueous sodium hydroxide solution containing no $Na_3PO_4$ was used.

EXPERIMENTAL EXAMPLE 1

Content Analysis of $PO_4$ Ion 0.01 g of each transition metal precursor prepared in Examples 1 to 4 and Comparative Example 1 was accurately weighted and added to a 50 ml corning tube, and a small amount of acid was added dropwise thereto, followed by shaking. The mixed sample was dissolved into a clear state and a concentration of $PO_4$ ions in the sample was measured by ion chromatography (model DX500 manufactured by Diones Corp.). Results are shown in the following Table 1.

TABLE 1

| Sample | $PO_4$ ion content (wt %) |
| --- | --- |
| Ex. 1 | 0.19 |
| Ex. 2 | 0.40 |
| Ex. 3 | 1.05 |
| Ex. 4 | 0.20 |
| Comp. Ex. 1 | 0 |

As can be seen from ion chromatography analysis results shown in Table 1, the content of $PO_4$ ions in the precursor linearly increased as an amount of the precursor increased.

EXPERIMENTAL EXAMPLE 2

Measurement of Tap Density

The transition metal precursors prepared in Examples 1 to 4 and Comparative Example 1 were tapped 1,000 or more times with a powder multi-tester (manufactured by Seishin Trading Co., Ltd.) and tap densities thereof were measured.

TABLE 2

| Sample | $PO_4$ ion content (wt %) |
| --- | --- |
| Ex. 1 | 1.92 |
| Ex. 2 | 2.04 |
| Ex. 3 | 2.20 |
| Ex. 4 | 1.95 |
| Comp. Ex. 1 | 1.71 |

As can be seen from ion chromatography analysis results of Table 2, the precursors containing $PO_4$ of Examples had extremely high tap densities, as compared to the precursor of Comparative Example.

EXAMPLE 5 to 8

Each of the nickel-cobalt-manganese composite transition metal precursors prepared in Examples 1 to 4 and $Li_2CO_3$ were mixed at a ratio (weight ratio) of 1:1, heated at a temperature increase rate of 5° C./min and then calcined at 950° C. for 10 hours to prepare a cathode active material powder of $Li[Ni_{0.4}Co_{0.2}Mn_{0.4}]O_2$.

The cathode active material powder thus prepared, Denka as a conductive material and KF1100 as a binder were mixed at a weight ratio of 95:2.5:2.5 to prepare a slurry and the slurry was uniformly coated to an aluminum foil having a thickness of 20 μm. The aluminum foil was dried at 130° C. to produce a cathode for lithium secondary batteries.

A 2016 coin battery was produced using the cathode for lithium secondary batteries, the lithium metal foil as a counter electrode (anode), a polyethylene membrane as a separator (Celgard, thickness: 20 μm) and a liquid electrolyte of 1M $LiPF_6$ in a mixed solvent containing ethylene carbonate, dimethylene carbonate and diethyl carbonate at a ratio of 1:2:1.

COMPARATIVE EXAMPLE 2

The nickel-cobalt-manganese composite transition metal precursor prepared in Comparative Example 1 was mixed with $Li_2CO_3$ at a ratio (weight ratio) of 1:1, heated at a temperature increase rate of 5° C./min and calcined at 950° C. for 10 hours to prepare $Li[Ni_{0.4}Co_{0.2}Mn_{0.4}]O_2$. The $Li[Ni_{0.4}Co_{0.2}Mn_{0.4}]O_2$ thus prepared was mixed with 1% by weight of $Li_3PO_4$ to prepare a cathode active material powder.

The cathode active material powder was mixed with Denka as a conductive material and KF1100 as a binder at a weight ratio of 95:2.5:2.5 to prepare a slurry and the slurry was uniformly coated onto aluminum foil having a thickness of 20 μm. The aluminum foil was dried at 130° C. to produce a cathode for lithium secondary batteries.

A 2016 coin battery was produced using the cathode for lithium secondary batteries, the lithium metal foil as a counter electrode (anode), a polyethylene membrane as a separator (Celgard, thickness: 20 μm) and a liquid electrolyte of 1M $LiPF_6$ in a mixed solvent containing ethylene carbonate, dimethylene carbonate and diethyl carbonate at a ratio of 1:2:1.

COMPARATIVE EXAMPLE 3

The nickel-cobalt-manganese composite transition metal precursor prepared in Comparative Example 1 was mixed with $Li_2CO_3$ in a ratio (weight ratio) of 1:1, heated at a temperature increase rate of 5° C./min and calcined at 950° C. for 10 hours to prepare $Li[Ni_{0.4}Co_{0.2}Mn_{0.4}]O_2$. The entire surface of $Li[Ni_{0.4}Co_{0.2}Mn_{0.4}]O_2$ thus prepared was coated with 1% by weight of $Li_3PO_4$ using mechanical fusion to prepare a cathode active material powder and a 2016 coin battery was then produced in the same manner as in Comparative Example 2.

COMPARATIVE EXAMPLE 4

The nickel-cobalt-manganese composite transition metal precursor prepared in Comparative Example 1 was mixed with $Li_2CO_3$ at a ratio (weight ratio) of 1:1, heated at a temperature increase rate of 5° C./min and calcined at 950° C. for 10 hours to prepare $Li[Ni_{0.4}Co_{0.2}Mn_{0.4}]O_2$. Then, a 2016 coin battery was produced in the same manner as in Comparative Example 2.

EXPERIMENTAL EXAMPLE 3

Regarding the coin batteries prepared in Examples 5 to 8 and Comparative Examples 2 to 4, electrical properties of cathode active materials at 3.0 to 4.25V were evaluated using an electrochemical analyzer (Toyo System, Toscat 3100U). The results are shown in the following Table 3.

TABLE 3

| Sample | Initial charge/discharge capacity (mAh/g) | Initial charge/discharge efficiency (%) |
|---|---|---|
| Ex. 5 (Ex. 1) | 159.1 | 90.1 |
| Ex. 6 (Ex. 2) | 161.2 | 91.2 |
| Ex. 7 (Ex. 3) | 160.4 | 90.6 |
| Ex. 8 (Ex. 4) | 159.3 | 90.3 |
| Comp. Ex. 2 | 156.8 | 88.9 |
| Comp. Ex. 3 | 157.4 | 89.1 |
| Comp. Ex. 4 | 157.7 | 89.2 |

As can be seen from Table 3, batteries according to Examples produced using the precursors treated with $PO_4$ exhibited improved charge/discharge efficiency and thus increased discharge capacity. The batteries of Comparative Examples exhibited low charge/discharge capacity and efficiency, as compared to batteries of Examples.

EXPERIMENTAL EXAMPLE 4

The coin batteries produced in Examples 5 to 8 and Comparative Examples 2 to 4 were charged at 0.2 C and discharged at 0.2 C and 2 C, and rate characteristics thereof were evaluated.

TABLE 4

| Sample | Rate characteristics 2 C/0.2 C (%) |
|---|---|
| Ex. 5 Ex. 1) | 90.4 |
| Ex. 6 (Ex. 2) | 91.5 |
| Ex. 7 (Ex. 3) | 90.3 |
| Ex. 8 (Ex. 4) | 90.1 |
| Comp. Ex. 2 | 88.7 |
| Comp. Ex. 3 | 89.1 |
| Comp. Ex. 4 | 88.7 |

As can be seen from Table 4, batteries according to Examples produced using the precursors treated with $PO_4$ exhibited improved rate characteristics and, in particular, the battery according to Example 6 produced using the precursor treated with 0.2 mol % of $PO_4$ exhibited optimal performance. The batteries of Comparative Examples using precursors not treated with $PO_4$ exhibited bad 2 C rate characteristics, as compared to batteries of Examples.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A lithium composite transition metal oxide using a transition metal precursor used for preparation of the lithium composite transition metal oxide, the transition metal precursor comprising a composite transition metal compound represented by the following Formula 2:

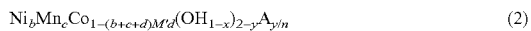  (2)

wherein
0.3≤b≤0.9;
0.1≤c≤0.6;
0≤d≤0.1;
b+c+d≤1;
M' comprises one, or two or more selected from the group consisting of Al, Mg, Cr, Ti, Cu, Fe and Zr;
A is PO4;
0<x<0.5;
0.01≤y≤0.5; and
n is an oxidation number of A.

2. The lithium composite transition metal oxide according to claim 1, wherein the anion A is present in an amount of 0.05 to 3% by weight, based on the total amount of the lithium composite transition metal oxide.

3. The lithium composite transition metal oxide according to claim 1, wherein the composite transition metal compound has a tap density of 1.5 to 2.5 g/cc.

4. The lithium composite transition metal oxide according to claim 1, wherein the composite transition metal compound is present in an amount of 30% by weight or more, based on the total amount of the transition metal precursor.

5. The lithium composite transition metal oxide according to claim 1, wherein the anion A is homogenously present on the surface and inside thereof.

* * * * *